US012683964B2

(12) United States Patent
Selesi et al.

(10) Patent No.: US 12,683,964 B2
(45) Date of Patent: Jul. 14, 2026

(54) AUTOMATIC HEALTH PROBES FOR ASSETS BASED ON PRE-CONFIGURED ACCESS METHODS

(71) Applicant: Cisco Technology, Inc., San Jose, CA (US)

(72) Inventors: Aaron Selesi, Simi Valley, CA (US); Ryan Holland, Pacifica, CA (US); Sravanth Yajamanam, San Jose, CA (US); Michael Freed, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 18/653,065

(22) Filed: May 2, 2024

(65) Prior Publication Data

US 2025/0343793 A1      Nov. 6, 2025

(51) Int. Cl.
| | |
|---|---|
| *H04L 9/40* | (2022.01) |
| *H04L 43/12* | (2022.01) |
| *H04L 67/14* | (2022.01) |
| *H04L 65/1066* | (2022.01) |
| *H04L 67/025* | (2022.01) |

(52) U.S. Cl.
CPC .............. *H04L 63/10* (2013.01); *H04L 43/12* (2013.01); *H04L 67/14* (2013.01); *H04L 65/1066* (2013.01); *H04L 67/025* (2013.01)

(58) Field of Classification Search
None
See application file for complete search history.

(56) References Cited

U.S. PATENT DOCUMENTS

| | | | | |
|---|---|---|---|---|
| 7,991,867 | B2 * | 8/2011 | Ma | H04L 43/0817 |
| | | | | 709/224 |
| 8,166,163 | B2 * | 4/2012 | Ma | H04L 43/12 |
| | | | | 709/224 |
| 9,106,696 | B2 * | 8/2015 | Pahlavan | H04L 63/0853 |
| 9,578,113 | B2 * | 2/2017 | Sullad | H04L 63/0407 |
| 9,686,323 | B1 * | 6/2017 | Helter | H04L 65/1066 |
| 10,579,322 | B1 * | 3/2020 | Rodrigues | G06F 21/31 |
| 11,025,635 | B2 * | 6/2021 | Patterson | H04L 63/102 |
| 11,709,804 | B1 * | 7/2023 | Korepanov | H04L 67/025 |
| | | | | 707/822 |

(Continued)

FOREIGN PATENT DOCUMENTS

WO      WO-2022271189 A1 * 12/2022 ............. G06F 9/547

*Primary Examiner* — Lashonda Jacobs-Burton
(74) *Attorney, Agent, or Firm* — Lee & Hayes, P.C.

(57)      ABSTRACT

In one embodiment, a method includes detecting, by a device, presence of a remote access session to a remote device and determining, by the device, one or more remote access session parameters in use during the remote access session. The method further includes enabling, by the device, creation of automatic remote access probing for the remote device based on the one or more remote access session parameters in use during the remote access session, monitoring, by the device, the remote access session for changes to the one or more remote access session parameters during the remote access session, and pushing, by the device, an updated configuration to the automatic remote access probing for the remote device based on the changes to the one or more remote access session parameters during the remote access session.

20 Claims, 4 Drawing Sheets

(56)     References Cited

U.S. PATENT DOCUMENTS

| 12,463,943 | B2 * | 11/2025 | Saini .................... H04L 63/0272 |
| 2006/0253545 | A1 * | 11/2006 | Lakamp ................ G06F 16/435 |
| | | | 709/217 |
| 2007/0061460 | A1 | 3/2007 | Khan et al. |
| 2007/0150946 | A1 * | 6/2007 | Hanberger .......... H04L 63/0272 |
| | | | 726/15 |
| 2008/0016206 | A1 * | 1/2008 | Ma .......................... H04L 43/12 |
| | | | 709/224 |
| 2009/0307351 | A1 * | 12/2009 | Raja ........................ H04L 67/56 |
| | | | 709/224 |
| 2011/0283134 | A1 * | 11/2011 | Ma .......................... H04L 43/12 |
| | | | 714/E11.073 |
| 2011/0319056 | A1 * | 12/2011 | Toy ..................... H04W 12/068 |
| | | | 455/412.2 |
| 2015/0150114 | A1 * | 5/2015 | Kuker ................. H04L 12/4641 |
| | | | 726/14 |
| 2016/0103669 | A1 | 4/2016 | Gamage et al. |
| 2018/0013837 | A1 * | 1/2018 | Subramanian .......... H04L 67/04 |
| 2018/0091591 | A1 | 3/2018 | Puri et al. |
| 2019/0087256 | A1 | 3/2019 | Horrell et al. |
| 2020/0036578 | A1 * | 1/2020 | Gupta ..................... H04L 67/60 |
| 2021/0117306 | A1 * | 4/2021 | Somashekar ....... G06F 11/3644 |
| 2021/0243244 | A1 * | 8/2021 | Liu ........................ H04W 12/50 |
| 2022/0232358 | A1 | 7/2022 | Wesby |

* cited by examiner

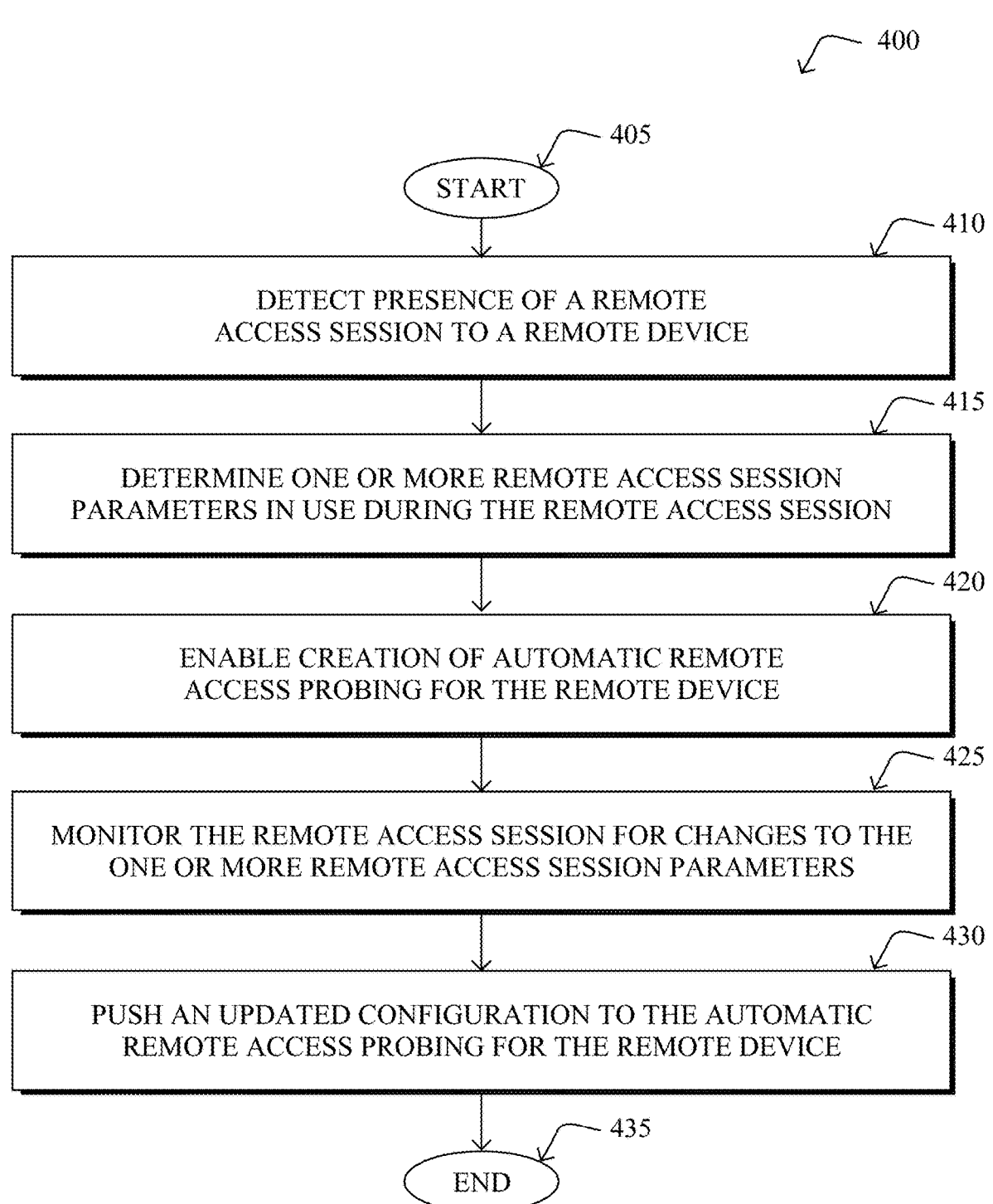

400

405

START

410

DETECT PRESENCE OF A REMOTE
ACCESS SESSION TO A REMOTE DEVICE

415

DETERMINE ONE OR MORE REMOTE ACCESS SESSION
PARAMETERS IN USE DURING THE REMOTE ACCESS SESSION

420

ENABLE CREATION OF AUTOMATIC REMOTE
ACCESS PROBING FOR THE REMOTE DEVICE

425

MONITOR THE REMOTE ACCESS SESSION FOR CHANGES TO THE
ONE OR MORE REMOTE ACCESS SESSION PARAMETERS

430

PUSH AN UPDATED CONFIGURATION TO THE AUTOMATIC
REMOTE ACCESS PROBING FOR THE REMOTE DEVICE

435

END

FIG. 4

AUTOMATIC HEALTH PROBES FOR ASSETS BASED ON PRE-CONFIGURED ACCESS METHODS

TECHNICAL FIELD

The present disclosure relates generally to computer networks, and, more particularly, to automatic health probes for assets based on pre-configured access methods.

BACKGROUND

Remote access to assets connected to network devices is a common requirement in operational technology (OT) environments. Users can set up secure remote access systems and configure access methods to access these assets. It is essential to monitor and maintain the health and security of these assets. Thus, health probes can be implemented on these assets to send health related info periodically. For example, health probes may be sent to one or more servers, load balancers, etc., where their reply indicates either simply whether they are "alive" (i.e., reachable/active) or other metrics (e.g., resource load, etc.). In the event any of the devices/services are not adequately responsive, other replacements or configurations may be used, accordingly.

However, while health probes themselves are ubiquitous in today's networking technologies, configuring these probes is not always a straightforward task, often prone to errors and difficulties. This is particularly true when it comes to remote access sessions, which could be complicated due to multiple access methods and ports being used.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 4 illustrates an example procedure for automatic health probes for assets based on pre-configured access methods in accordance with the disclosure.

DESCRIPTION OF EXAMPLE EMBODIMENTS

Overview

According to one or more embodiments of the disclosure, a method includes detecting, by a device, presence of a remote access session to a remote device and determining, by the device, one or more remote access session parameters in use during the remote access session. The method further includes enabling, by the device, creation of automatic remote access probing for the remote device based on the one or more remote access session parameters in use during the remote access session, monitoring, by the device, the remote access session for changes to the one or more remote access session parameters during the remote access session, and pushing, by the device, an updated configuration to the automatic remote access probing for the remote device based on the changes to the one or more remote access session parameters during the remote access session.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computing system.
Figure 1:
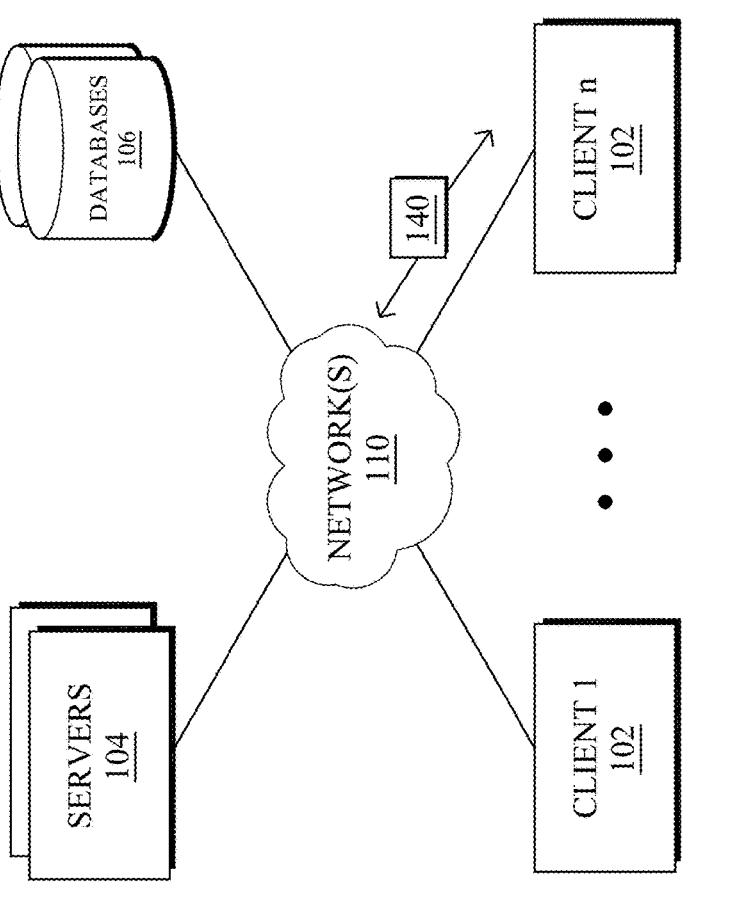

FIG. 1 is a schematic block diagram of an example simplified computing system (e.g., computing system 100) illustratively comprising any number of client devices (e.g., client devices 102, such as a first through $n^{th}$ client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
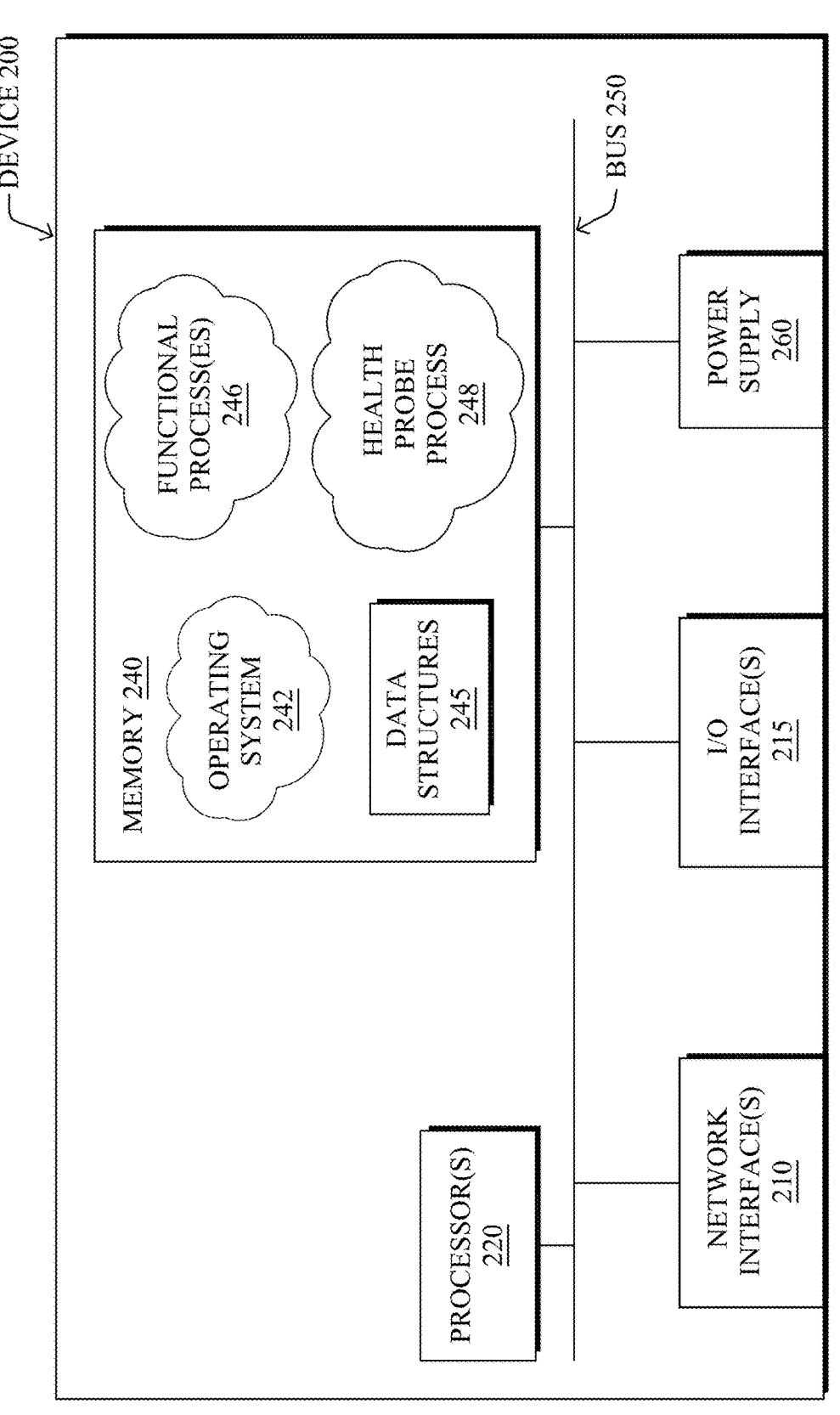
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a health probe process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

——Automatic Health Probes for Assets Based on Pre-Configured Access Methods——

As noted above, remote access to assets connected to network devices is a common requirement in operational technology (OT) environments. Users can set up secure remote access systems and configure access methods to access these assets. It is essential to monitor and maintain the health and security of these assets. Thus, health probes can be implemented on these assets to send health related info periodically. For example, health probes may be sent to one or more servers, load balancers, etc., where their reply indicates either simply whether they are "alive" (i.e., reachable/active) or other metrics (e.g., resource load, etc.). In the event any of the devices/services are not adequately responsive, other replacements or configurations may be used, accordingly.

However, while health probes themselves are ubiquitous in today's networking technologies, configuring these probes is not always a straightforward task, often prone to errors and difficulties. This is particularly true when it comes to remote access sessions, which could be complicated due to multiple access methods and ports being used.

The techniques herein therefore monitor remote access sessions for configuration and updates to the access methods, protocols, and/or ports used for these remote access sessions and can perform operations to auto-update the probe configurations to match. In some implementations, as discussed below, the probes can be health probes.

Specifically, according to one or more embodiments of the disclosure as described in detail below, a method includes detecting, by a device, presence of a remote access session to a remote device and determining, by the device, one or more remote access session parameters in use during the remote access session. The method further includes enabling, by the device, creation of automatic remote access probing for the remote device based on the one or more remote access session parameters in use during the remote access session, monitoring, by the device, the remote access session for changes to the one or more remote access session parameters during the remote access session, and pushing, by the device, an updated configuration to the automatic remote access probing for the remote device based on the changes to the one or more remote access session parameters during the remote access session.

Figure 3:
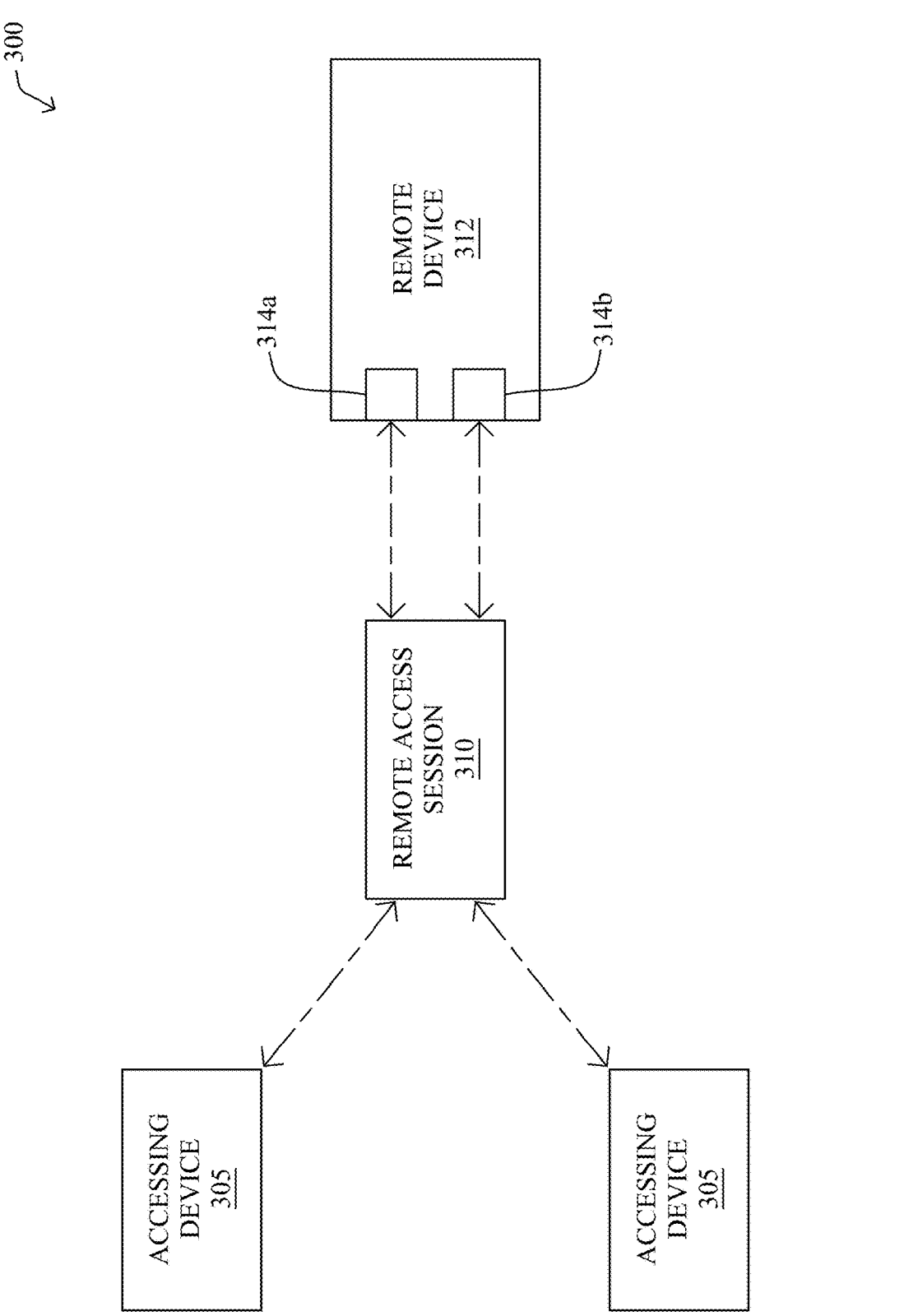
FIG. 3 illustrates an example system for automatic health probes for assets based on pre-configured access methods in accordance with the disclosure.

Operationally, FIG. 3 illustrates an example system 300 for automatic health probes for assets based on pre-configured access methods in accordance with the disclosure. As shown in FIG. 3, the system 300 includes a remote access session 310 that is communicatively coupled to a remote device 312 via a network 316 (e.g., similar to computing system 100 or other suitable communication environments). The remote device can be a programmable logic controller (PLC), although implementations are not limited to this specific example.

As will be appreciated, the remote access session 310 can allow one or more computing devices (e.g., accessing devices 305) to connect to a different device, such as the remote device 312 without being physically present in a same location as the remote device 312. In general, the remote access session 310 is facilitated using a combination of hardware, software, and network connectivity that allow for the one or more computing devices to connect to a remote device (e.g., an asset) via a network connection. In some implementations, the remote access session 310 can provide a user interface (e.g., a graphical user interface) to a user of a "local" device to view and/or interface with the remote device when the remote device is located in a different physical location other than the local device location.

The remote device 312 can include a plurality of ports, such as a first port 314a, a second port 314b, etc. (e.g., a first port to an $n^{th}$ port). As shown in FIG. 3, the ports are built into the remote device 312 although implementations are not so limited. As will be appreciated, the ports can include one or more universal serial bus (USB) ports, Ethernet ports, RS-232 ports, RS-485 ports, and/or RS-422 ports.

In accordance with the disclosure, as users configure their secure remote access system (e.g., the remote access session 310) to access devices (e.g., the remote device 312) remotely, they can do so using various access methods and protocols. According to the techniques described herein, and in contrast to approaches mentioned above, instead of configuring remote access probing (e.g., health probes) manually, the systems and methodologies herein can automatically define the health probe to collect information based on the configured remote access methods and/or the remote access protocols implemented by the system 300.

For example, assume a user connected to the remote access session 310 would like to test the remote device 312 (e.g., a PLC) using a particular access method on a particular port (e.g., Http port 80) using a particular uniform resource locator (URL). Traditional remote access probing (e.g., health probe) configurations may be difficult to implement in this scenario, because multiple access methods and/or ports may cause complication, particularly if they change over the course of the remote access session. In contrast, the techniques described herein can analyze the access methods and/or ports on-the-fly and can dynamically reconfigure the remote access probing techniques (e.g., the health probe) accordingly.

Another example may be a scenario where the access methods use a range of ports to open a remote session using, for example Secure Equipment Access (e.g., SEA or SEA+ available from Cisco Systems, Inc.). Although in this scenario, a range of ports may be specified, the remote access session 310 may be unlikely to be using them all and may instead be utilizing a subset of the range of ports allowed. In scenarios such as this, when running remote access probing, such as a health probe, it may be beneficial to analyze and determine which ports are or were in use, and then configure (or reconfigure) the remote access probes accordingly.

In a non-limiting example, the remote access session 310 is detected and/or allowed. That is, it can be determined that the remote access session 310 is operating and that the remote access session 310 is in communication with the remote device 312 (e.g., a specific asset). In some implementations, the remote access session 310 can operate according to a remote desktop protocol (RDP) or any other suitable protocol that allows for operation of the remote access session 310.

While the remote access session 310 is operating, a remote access technology and/or a remote access protocol can be determined. For example, a determination can be made as to whether a SEA, RDP, etc. access technology is being used in connection with the remote access session 310. In addition to, or in the alternative, a determination can be made as to which ports (e.g., the first port 314a, the second port 314b, etc.) are being used by the remote device 312 in connection with the remote access session 310. This information may be used to determine if updates to any remote access probing can be made in accordance with the disclosure.

Continuing with this non-limiting example, creation of one or more remote access probes can be enabled for the remote device 312. For example, a health probe for the remote device 312 can be set up based on the detected remote access technology, the remote access protocol, and/ or the ports discussed above. In some implementations, the enabling of creation of the remote access probes can occur in response to an input from a user to a user interface (e.g., a graphical user interface).

The remote access session 310 is then monitored for changes to the remote access technology, the remote access protocol, and/or the ports. In some implementations, this monitoring can be performed using an auto-detection mechanism. Implementations are not so limited, however, and in some implementations, the monitoring can be performed based on the remote device 312 providing a notification to the remote access session 310 and/or to a user of the remote access session 310 that a change to the remote access technology, the remote access protocol, and/or the ports has occurred.

In response to changes to the remote access technology, the remote access protocol, and/or the ports occurring, a new configuration (e.g., a "monitored configuration") can be pushed onto the remote device 312. In some implementations, the new configuration can be pushed on-demand to the remote device 312 while in other implementations, the new configuration can be pushed periodically to the remote device 312. In addition, the remote access probe(s) can be reconfigured based on the changes to the remote access technology, the remote access protocol, and/or the ports occurring.

In closing, FIG. 4 illustrates an example procedure for automatic health probes for assets based on pre-configured access methods in accordance with the disclosure. For example, a non-generic, specifically configured device (e.g., device 200, an apparatus, etc.) may perform procedure 400 by executing stored instructions (e.g., process 248). The procedure 400 may start at step 405, and continues to step 410, where, as described in greater detail above, the device detects the presence of a remote access session to a remote device. The remote device can be, for example, a programmable logic controller, although implementations are not so limited.

In some implementations, detecting the presence of the remote access session can include permitting the remote access session to occur. Implementations are not so limited, however, and in some implementations, detecting the presence of the remote access session can be based on enabling the remote access session via a user interface. Further, as discussed above, in some implementations, the remote access session operates according to a remote desktop protocol.

The procedure 400 may then continue to step 415 where, as described in greater detail above, the device determines one or more remote access session parameters in use during the remote access session. The remote access session parameters can include various technologies (e.g., access technologies), access protocols, access methods, etc. In addition to, or in the alternative, the remote access session parameters can be associated with particular access methods, access ports, etc.

The procedure 400 may then continue to step 420 where, as described in greater detail above, the device enables creation of automatic remote access probing for the remote device based on the one or more remote access session parameters in use during the remote access session. As discussed above, the automatic remote access probing can include deploying one or more health probes.

The procedure 400 may then continue to step 425 where, as described in greater detail above, the device monitors the remote access session for changes to the one or more remote access session parameters during the remote access session. In some implementations, monitoring the remote access session for changes to the remote access session can be performed via an auto-detection mechanism and/or monitoring the remote access session for changes to the remote access session can be performed via a notification generated by the remote device responsive to the changes to the remote access session. Further, as discussed above, the changes to the remote access session can be selected from a group consisting of: changes to access methods; changes to access ports; and changes to access protocols.

The procedure 400 may then continue to step 430 where, as described in greater detail above, the device pushes an updated configuration to the automatic remote access probing for the remote device based on the changes to the one or more remote access session parameters during the remote access session. In some implementations, the procedure 400 includes pushing the updated configuration on-demand in response to the changes to the remote access session. Implementations are not so limited, however, and in some implementations, the procedure 400 can include pushing the updated configuration periodically.

Procedure 400 may end at step 435.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: detecting presence of a remote access session to a remote device; determine one or more remote access session parameters in use during the remote access session; enable creation of automatic remote access probing for the remote device based on the one or more remote access session parameters in use during the remote access session; monitor the remote access session for changes to the one or more remote access session parameters during the remote access session; and push an updated configuration to the automatic remote access probing for the remote device based on the changes to the one or more remote access session parameters during the remote access session.

In still other implementations, a tangible, non-transitory, computer-readable medium storing program instructions that cause a device to execute a process comprising: detecting, by a device, presence of a remote access session to a remote device; determining, by the device, one or more remote access session parameters in use during the remote access session; enabling, by the device, creation of automatic remote access probing for the remote device based on the one or more remote access session parameters in use during the remote access session; monitoring, by the device, the remote access session for changes to the one or more remote access session parameters during the remote access session; and pushing, by the device, an updated configuration to the automatic remote access probing for the remote device based on the changes to the one or more remote access session parameters during the remote access session.

The techniques described herein, therefore, provide for automatic health probes for assets based on pre-configured access methods. As discussed above, the techniques herein allow for remote access sessions to be monitored for configuration and updates to the access methods, protocols, and/or ports used for the remote access sessions and can perform operations to auto-update the probe configurations to match the changes and/or updates to the remote access sessions.

Illustratively, the techniques described herein may be performed by hardware, software, and/or firmware, (e.g., an "apparatus") such as in accordance with the health probe process, process 248, (e.g., a "method"), which may include computer-executable instructions executed by the processor (s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:
    determining at least one remote access session configuration parameter in use during a remote access session between an accessing device and a remote device;
    enabling creation of one or more automatic remote access probes for probing the remote device during the remote access session;
    monitoring, using the one or more automatic remote access probes, the remote access session for a change to the at least one remote access session configuration parameter during the remote access session; and
    based at least in part on the change occurring, pushing an updated configuration to the remote device during the remote access session, the updated configuration based at least in part on the change to the at least one remote access session configuration parameter.

2. The method of claim 1, further comprising:
    detecting presence of the remote access session.

3. The method of claim 2, wherein detecting the presence of the remote access session is based at least in part on enabling the remote access session via a user interface.

4. The method of claim 1, wherein monitoring the remote access session for the change is performed via an auto-detection mechanism.

5. The method of claim 1, wherein monitoring the remote access session for the change is performed via receiving a notification generated by the remote device responsive to the change.

6. The method of claim 1, wherein the change is selected from a group consisting of: a change to an access method, a change to an access port, and a change to an access protocol.

7. The method of claim 1, further comprising:
    pushing the updated configuration on-demand in response to the change.

8. The method of claim 1, further comprising:
    pushing the updated configuration periodically.

9. The method of claim 1, wherein the remote access session operates according to a remote desktop protocol.

10. The method of claim 1, wherein the remote device comprises a programmable logic controller.

11. The method of claim 1, wherein the one or more automatic remote access probes comprise one or more health probes.

12. An apparatus, comprising:
    one or more network interfaces to communicate with a network;
    a processor coupled to the one or more network interfaces and configured to execute one or more processes; and
    a memory configured to store a process that is executable by the processor, the process comprising:
    determining at least one remote access session configuration parameter in use during a remote access session between an accessing device and a remote device;
    enabling creation of one or more automatic remote access probes for probing the remote device during the remote access session;
    monitoring, using the one or more automatic remote access probes, the remote access session for a change to the at least one remote access session configuration parameter during the remote access session; and
    based at least in part on the change occurring, pushing an updated configuration the remote device during the remote access session, the updated configuration based at least in part on the change to the at least one remote access session configuration parameter.

13. The apparatus of claim 12, wherein the process further comprises:
    detecting presence of the remote access session by permitting the remote access session to occur; or
    detecting the presence of the remote access session based at least in part on enabling the remote access session via a user interface.

14. The apparatus of claim 12, wherein monitoring the remote access session for the change is performed via an auto-detection mechanism.

15. The apparatus of claim 12, wherein monitoring the remote access session for the change is performed via receiving a notification generated by the remote device responsive to the change.

16. The apparatus of claim 12, wherein the change is selected from a group consisting of: a change to an access method, a change to an access port, and a change to an access protocol.

17. The apparatus of claim 12, wherein the process further comprises:

pushing the updated configuration on-demand in response to the change; or pushing the updated configuration periodically.

18. The apparatus of claim 12, wherein the remote device comprises a programmable logic controller.

19. The apparatus of claim 12, wherein the one or more automatic remote access probes comprise one or more health probes.

20. A tangible, non-transitory, computer-readable medium storing program instructions that cause a device to execute a process comprising:

determining at least one remote access session configuration parameter in use during a remote access session between an accessing device and a remote device;

enabling creation of one or more automatic remote access probes for probing the remote device during the remote access session;

monitoring, using the one or more automatic remote access probes, the remote access session for a change to the at least one remote access session configuration parameter during the remote access session; and based at least in part on the change occurring, pushing an updated configuration the remote device during the remote access session, the updated configuration based at least in part on the change to the at least one remote access session configuration parameter.

* * * * *